United States Patent [19]

Lappington

[11] Patent Number: 5,381,459
[45] Date of Patent: Jan. 10, 1995

[54] SYSTEM FOR DISTRIBUTING RADIO TELEPHONE SIGNALS OVER A CABLE TELEVISION NETWORK

[75] Inventor: John Lappington, Lawrenceville, Ga.

[73] Assignee: Cable Television Laboratories, Inc., Boulder, Colo.

[21] Appl. No.: 145,300

[22] Filed: Nov. 3, 1993

Related U.S. Application Data

[63] Continuation of Ser. No. 736,317, Jul. 29, 1991, abandoned.

[51] Int. Cl.$^6$ .................. H04M 1/64; H04N 7/14; H04N 7/04; H04J 3/17
[52] U.S. Cl. ........................... 379/56; 370/80; 370/85.1; 375/38; 455/53.1; 348/10; 348/19; 348/423
[58] Field of Search .............. 358/85, 147; 370/85.1, 370/80; 375/38; 379/56, 58, 59; 455/33.1, 39, 49, 53.1, 54

[56] References Cited

U.S. PATENT DOCUMENTS

| | | | |
|---|---|---|---|
| 3,974,337 | 8/1976 | Tatsuzawa | 358/85 |
| 3,993,955 | 11/1976 | Belcher et al. | 358/85 |
| 4,349,701 | 9/1982 | Snopko . | |
| 4,562,572 | 12/1985 | Goldman et al. | 370/80 |
| 4,644,526 | 2/1987 | Wu . | |
| 4,710,955 | 12/1987 | Kauffman . | |
| 4,750,036 | 6/1988 | Martinez | 358/147 |
| 4,757,496 | 7/1988 | Bartholet et al. . | |
| 4,912,721 | 3/1990 | Pidgeon, Jr. et al. . | |
| 4,941,040 | 7/1990 | Pocock et al. . | |
| 5,138,649 | 8/1992 | Krisbergh et al. | 379/56 |
| 5,235,619 | 8/1993 | Beyers, II et al. | 375/38 |
| 5,276,680 | 1/1994 | Messenger | 370/85.1 |

FOREIGN PATENT DOCUMENTS

| | | | |
|---|---|---|---|
| 0360589 | 3/1990 | European Pat. Off. . | |
| 2331223 | 7/1977 | France | 358/85 |
| 2336017 | 7/1977 | France | 358/85 |
| 3818371 | 12/1989 | Germany | 455/53.1 |
| 9100774 | 9/1992 | United Kingdom | 379/58 |
| 8701002 | 2/1987 | WIPO . | |

OTHER PUBLICATIONS

Mason, "Report: Broadband Will Drive Economy", Telephony Mar. 2, 1992.
EPO Search Report 92 40 1944.
International Conference on Communications, ICC Chicago, Jun. 14–18, 1992, Conference Record, vol. 1 of 4.
News Release, Cox Enterprises, Jul. 13, 1992, "Cox to Test Remote Antenna Drive at Its PCS Site in San Diego, Ca".
PCN and Cable: A View of Our Future, Conference, Jan. 16, 1990, including articles "PCN and Cable TV Plant" by David Fellows *Scientific Atlanta*; The Unwiring of America: Cable's Opportunity by John Egan; PCN on CATV by Nick Hamilton-Piercy (Rogers Cablesystems).

*Primary Examiner*—Curtis Kuntz
*Assistant Examiner*—William Cumming
*Attorney, Agent, or Firm*—Duft, Graziano & Forest

[57] ABSTRACT

A system for distributing remote telephone traffic between a base station and remote antenna site is disclosed. The base station and remote antenna sites are connected via a cable television network. The base station receives from a public telephone network parallel channels of outbound voice signals for radio telephones operating within the cellular areas of the remote antenna sites. The base station will digitize and time compress each of these outbound telephone signals, and insert them in a transmit frame. The transmit frame is modulated on a subcarrier and applied to the cable television network. A plurality of remote sites are connected to the cable television network and receive and rebroadcast digitized voice signals to radio telephones operating within their cellular areas. Inbound serial channel data received from a radio telephone is inserted in a serial receive data frame. A second subcarrier is modulated with the receive data frame and applied to the cable television network for transmission upstream to the base station. The base station will demodulate the inbound receive frame and apply the digitized voice signals to the public telephone network to complete a telephone communication link.

14 Claims, 6 Drawing Sheets

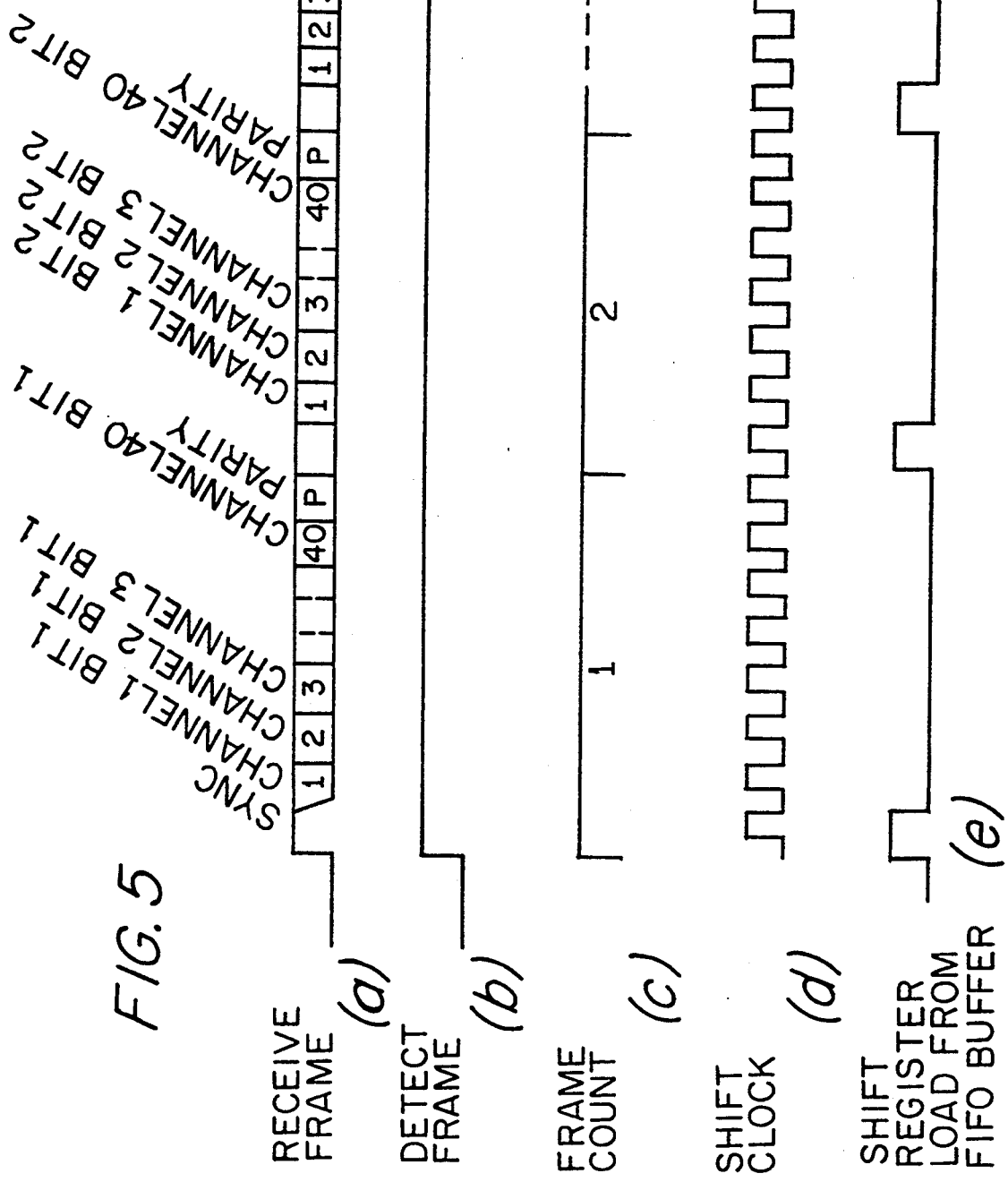

SYSTEM FOR DISTRIBUTING RADIO TELEPHONE SIGNALS OVER A CABLE TELEVISION NETWORK

This application is a continuation of application Ser. No. 07/736,317 filed Jul. 29, 1991 now abandoned.

The present invention relates to cable television network systems and specifically to a system for interconnecting a base station to remote cellular telephone antenna sites using a cable television network.

Cellular telephone technology has grown in the U.S. and throughout the world to a point where a limitation on the number of subscribers has been reached due to a limitation on the available bandwidth needed for additional channels. New technology is being developed to promote more bandwidth compression for telephone traffic, permitting more channels to be available for yet additional subscribers. As part of this effort, a digital transmission system has been proposed such that telephone traffic can be digitized and packetized for transmission between the base station and remote antenna sites. These systems employ a transceiver at the remote antenna sites, which can receive and transmit the compressed digital signals to portable or mobile telephone systems.

As an additional technique for obtaining more subscribers, and hence having more traffic carried via these cellular telephone systems, it has been proposed to use individual antenna sites which have a communication range limited to 600 feet. One such system proposed in Europe is the CT2 system which utilizes 40 channels to carry the digitized telephone traffic to and from the mobile or remote telephone facility. The channels each carry digital voice data at a data rate of 72K bits/second.

The CT2 specification provides a radio frequency link with the mobile or remote telephone facility having 40 channels, simultaneously transmitted on separate carriers having a frequent spacing of 100 KHz. The nominal carrier frequency for these 40 channels lies within the band of 864–868 MHz. Each bit time for the 72 kilobit channel data stream is 13.89 microseconds. The system provides for a half duplex operation with a transmit and receive frame separated by a 55 millisecond guardband.

The advantages of reducing cell size to increase the total capacity of the cellular network, are to a degree offset by the requirement for additional interconnections between each of the cell base stations and remote antenna sites. The cabling between these remote antenna sites and the local base station, as well as inter-networking other base stations to communicate with the local area telephone network is an expense and complication seriously challenging the viability of such a proposed system.

The present invention is directed to taking advantage of existing cable television networks, now used to transmit television programming to homeowners on a subscription basis to interconnect remote antenna sites and the base stations. As most of the U.S. has become wired with these facilities, the use of the cable to interconnect the base station and plurality of remote sites used in such a CT2 cellular concept has significant possibilities in overcoming the interconnection problem. The use of the cable television network for this purpose, however, must be done without any interruption or noticeable degradation of the television service now offered by these systems.

SUMMARY OF THE INVENTION

It is a primary object of this invention to use a cable television network to interconnect remote antenna sites of a cellular telephone system to a base station.

It is a more specific object of this invention to utilize the cable television network to interconnect the base station of a CT2 digital cellular telephone system to remote antenna sites.

These and other objects of the invention are provided for by a system which interconnects a base station connected to the head end of a cable television facility with a plurality of remote antenna sites. The base station interface provides on one side thereof a CT2 -type interface with a PBX switching system connected to the telephone local area network.

The base station receives 40 parallel channel voice signals from the PBX, which are to be distributed to the various remote antenna sites. The 40 voice channel signals are digitized, compressed, serialized and inserted in a transmit data frame. The remote antenna sites transmit the voice signals via a radio link to mobile or portable telephones operating within the geographical area of the remote antenna sites.

The digitized voice data is applied to the cable television network at the head end by modulating the transmit data frame on a single subcarrier. Each of the remote antenna sites will remove the transmit data frame carrying digitized voice from the head end base station, and convert the digitized 40 channels into the CT2 format parallel channel data. The remote antenna sites simultaneously transmit the digitized voice channels via the carrier signals of the CT2 radio frequency link in a transmit data frame to the radio telephones operating with the cells.

Digital voice signals are transmitted from the radio telephones in a receive data frame subsequent to the transmit data frame on the various carriers associated with each of the channels. The remote antenna sites remove the digital voice signals from the carriers, and reformat the voice data in a second receive data frame for transmission over the cable network to the head end. In accordance with a preferred embodiment of the invention, the most distant remote antenna site will first transfer a frame of voice data to the next adjacent remote antenna site. The next adjacent remote antenna site will add to the data frame channel data it has recovered from remote and mobile radio telephone facilities operating within its cell. The updated receive frame is then transferred to the next adjacent remote antenna site where data recovered from radio telephones within that antenna cell are added to the reconstituted receive data frame.

The final receive data frame comprising data taken from each of the remote antenna sites is transferred via a subcarrier of a different frequency than the transmit frame back to the head end cable plant. The base station at the cable plant is equipped with a demodulator for removing the receive frame from the second subcarrier signal, and forming parallel CT2 data channels. The data channels are converted to analog voice signals and applied to the PBX, where it is connected to the local area network.

The use of data frames which meet the CT2 specification requiring a 55 millisecond guardband provides for sufficient isolation between transmit and receive frames to avoid the consequences of delays incurred during a handoff from each remote antenna site to an adjacent remote antenna site. Thus, the cable system can carry all the channels of the CT2 cellular telephone system frame.

DESCRIPTION OF THE FIGURES

FIG. 5 is a timing diagram illustrating the operation of the receive portion of the communication equipment at the remote site.

DESCRIPTION OF THE PREFERRED EMBODIMENT

Figure 1:
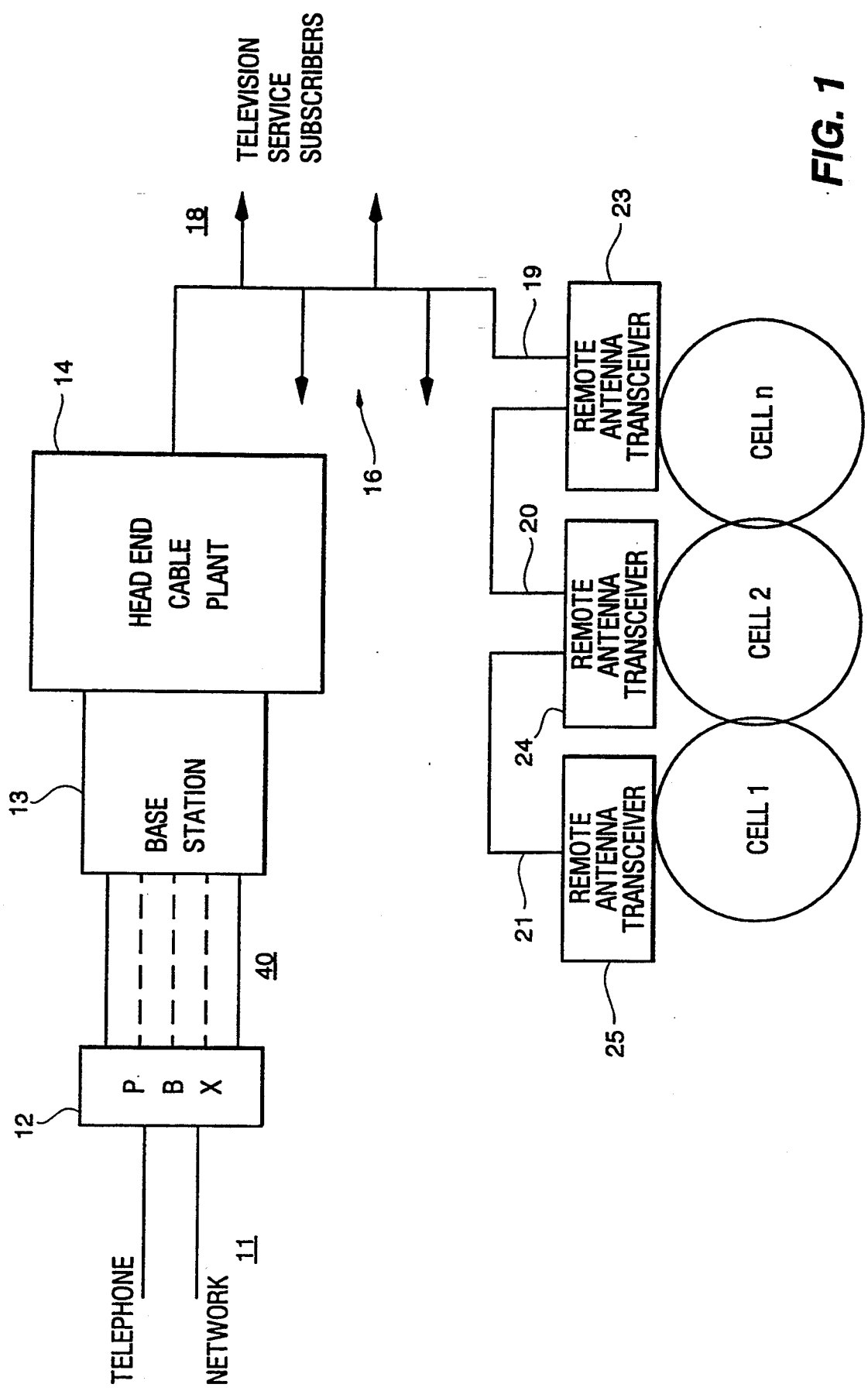
FIG. 1 is a representation of the system in accordance with the preferred embodiment for carrying telephone traffic over a cable television network.

Referring now to FIG. 1, there is shown a cable network comprising a head end cable plant 14 connected through a cable network 16 to a plurality of television subscriber drops 18. The head end cable plant originates cable television signals for distribution via the cable drops to the various television service subscribers.

The cable television network of FIG. 1 includes a base station 13 connected to a PBX 12. The PBX 12 receives telephone traffic via the local area network 11 and provides for a plurality of channels representing telephone connections for a two-way communication. In the example shown in FIG. 1, the PBX will supply 40 channels of two-way telephone traffic.

The base station 13 is shown as the interface between the PBX 12 and the head end cable plant 14. As will be evident with respect to other Figures, the base station 13 digitizes each of the 40 outgoing channels and serializes the digital outgoing signals. The serialized outgoing signals are packed in a transmit frame, including various sync bits and parity bits before being modulated on a subcarrier. The transmit frame has a time period equal to a standard CT2 transmit frame, but the digital voice data is compressed so that 40 channels can fit in the transmit frame which normally carries a single channel. The subcarrier lies within the frequency range reserved for downstream communication over the cable network 16.

It should be understood that serializing the channel data may not be necessary for the downstream transmission of the outgoing telephone traffic. For instance, a plurality of 40 subcarriers could be used in which to directly modulate the digitized outgoing signal traffic, thereby requiring all 40 subcarriers to be demodulated at the remote sites.

The cable network 16 is shown connected via drops 19, 20 and 21 to three remote antenna sites 23, 24 and 25.

In accordance with the preferred embodiment, each of the remote antenna sites provides a radio frequency communication link to mobile or remote telephones lying within the coverage area of the antenna site. This coverage area lies within a 650-foot radius from each of the remote antennas, as set forth in the CT2 specification.

The remote antenna site 23, 24, 25 provide a radio link for the 40 channels of two-way communication in accordance with the CT2 standards with each radio telephone unit. As can be seen from FIG. 1, there is some minor overlap between cellular areas, thus making it possible for a radio telephone to communicate with more than one antenna site.

Each of the remote antenna sites in the preferred embodiment receives from the cable network 16 the transmit frame of 40 channels of outgoing traffic modulated. The 40 channels are demodulated from the subcarrier and formed into parallel CT2 digital channels. The CT2 digital voice channels are modulated by each of the remote antenna sites 23, 24 and 25 on 40 carrier signals operating within the CT2 radio frequency specification. Thus, all remote sites simultaneously transmit all 40 channels of outgoing traffic received from the head end plant 14.

Once the transmit frame has been sent by the base station 13 over the cable television network 16, a 55 millisecond guardband is provided before the receive frame, carrying inbound communication traffic from each of the remote antenna sites 23, 24 and 25 is modulated on a second subcarrier and applied to the cable television network 16. The receive frame will be demodulated by the base station 13, and 40 channels of receive information will be converted to parallel incoming analog signals for connection to the PBX 12.

In accordance with the preferred embodiment of the invention, the receive frame will be initiated by the furthest remote antenna 25, following the 55 millisecond guardband. In this scenario, the remote antenna site 25 will generate a receive frame comprising all the digital telephone traffic received in each channel operating within its cellular area. The receive frame will be modulated on yet another third subcarrier, and applied to the cable 16 via drop 21.

The drop 20 connecting the remote antenna site 24 to the drop 21 via the cable 16 will include a notch filter on its outbound side having a notch frequency at the third subcarrier frequency to inhibit transmitting the receive frame from the remote antenna site 25 down the cable network 16. The remote antenna site 24 will, however, add to this receive data frame any digital data it has received from channels operating within its cellular area. The reconstituted receive frame will be transmitted via a fourth subcarrier to the remote antenna site 23 via the drop 19. Remote antenna site 23 will, in turn, filter out the fourth subcarrier signal, keeping it from reaching the head end plant 14.

Remote antenna site 23 will in a like manner, add to the reconstituted receive frame any channel data received within its cellular area. The receive frame is then transmitted via the second subcarrier signal for communication with the head end cable plant 14.

The foregoing scenario will accommodate radio telephone traffic which originates in a cellular area common to two antenna sites. Thus, if antenna sites 23 and 24 receive inbound digital telephone traffic on channel 24, each will have the opportunity to insert this traffic into the receive frame. During this insertion process, the signal levels detected at each of the remote antenna sites will be used to validate whether or not the data received is reliable for insertion in the receive frame. Thus, where one antenna site receives only a marginal signal, only the other antenna site's data will be provided. If both sites produce reliable data for the same channel, the same data will be inserted by the subsequent antenna site in the receive data frame.

Figure 2:
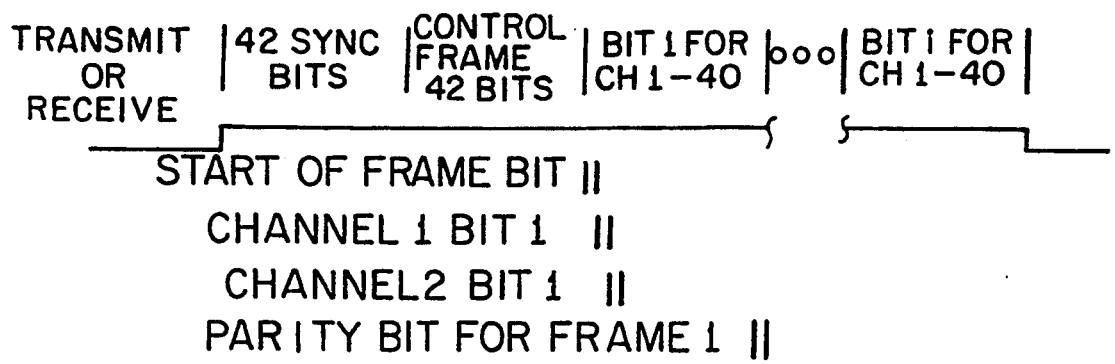
FIG. 2 illustrates the transmit or receive frames of the digital voice channel data for communication over the cable television network.

Referring now to FIG. 2, there is shown a frame which can be either a transmit or receive frame for carrying digitized telephone traffic over the cable network 16. The transmit or receive frame includes 42 sync bits to synchronize the demodulators which will demodulate either the transmit or receive frame. A further 42 bits of control information, as known from the CT2 specification, is serially transmitted following the 42 sync bits. The remaining portion of the frame is dedicated for carrying digitized telephone traffic for each of the 40 channels.

The digital telephone traffic has up to 32,000 bits, as specified by the CT2 specification, and is compressed such that in 13.8 microseconds, a like-ordered number of bits of each of the 40 channels are sent as a group. Thus, in the first grouping of digitized telephone traffic, bit number 1 for each of the 40 channels is located in the 13.8 microsecond window. In the second group of digital data bits, bit number 2 from each of the channels is located etc. until all 40 channels have their like numbered bits grouped in the transmit or receive frame.

In the CT2 specification, each channel bit occupies 13.8 microseconds of a transmit or receive frame of the radio link connecting the remote antenna sites to the radio telephones. In the system for using the cable television network to carry the transmit and receive frames, each channel bit period of 13.8 microseconds is used to carry all the like-ordered number of bits of all the channels. The 40 parallel channels must be serialized at a clock rate more than 40 times as fast as each of the 13.8 microsecond CT2 specification channel slots in order to compress the 40 channels within the transmit receive frame of the CT2 standard.

Figure 3A:
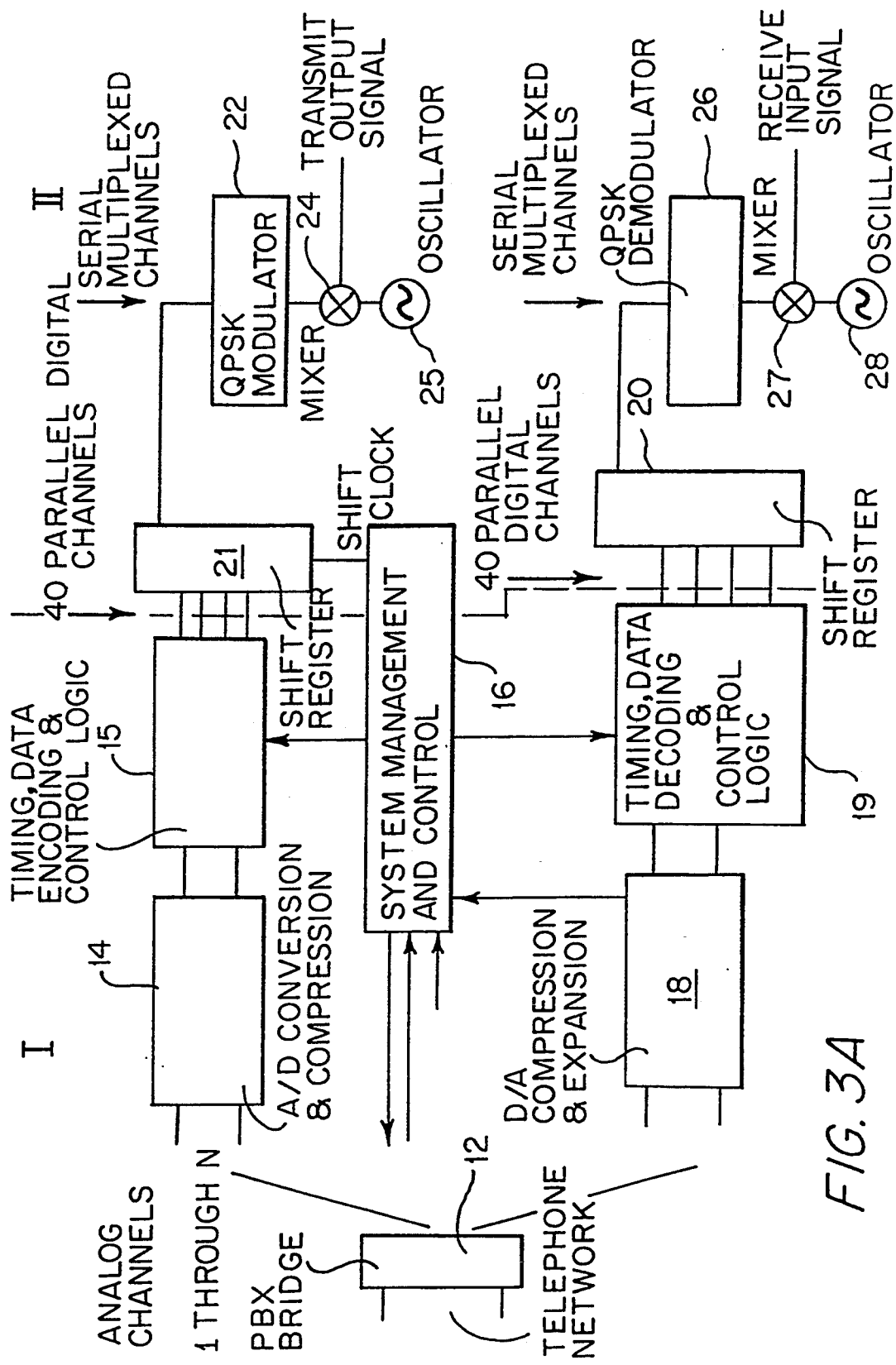
FIG. 3A illustrates the CT2 base station of the CT2 digital cellular communication system modified to transmit and receive 40 channels of digital voice signals in the frame time of a single CT2 radio telephone channel.

Referring now to FIG. 3A, there is shown a modified CT2 base station which will formulate each of 40 parallel digitized outgoing channels into a single transmit frame. The modified CT2 base station will also receive the receive frame, via a subcarrier, from the downstream remote antenna sites. The circuitry denoted as I can be found in the standard CT2 base stations, whereas the modifications represented by II are the interface necessary to provide the transmit frame of FIG. 2 for transmitting the digitized voice channels via a subcarrier on the cable network to the downstream remote antenna sites.

The PBX 12 receives from the local area network analog outgoing signals to be conveyed to the downstream remote antenna sites. The PBX also will receive from the digital to analog converter 18 individual incoming signals for completing the voice channel with the PBX. Outgoing signals from the PBX are received by the analog to digital converter and compression device 14. As is known in standard telephone technology, the digitizing may be done with A law or u law compression such as to reduce the required number of bits to maintain a certain quality level. The digitized compressed channel data is thereafter serialized under control of the timing circuit 15. The timing circuit 15 will apply in parallel each of the digitized 40 channels to shift register 21. The bit stream for each channel is shifted by a shift clock at a bit rate of more than 40 times the channel bit rate of the incoming channel data. Thus, the shift register 21 shifts one bit of all 40 channels in a time period reserved in the CT2 system for a complete channel of data. The 13.8 microsecond time interval reserved in the CT2 specification for a bit of channel data will now contain one bit of all 40 digital voice channels. The entire 40 channels of digital data are thereby compressed into a time interval occupied by the transmit frame of the radio telephone link of the CT2 specification system.

The system management and control 16 will generate the shift clock signal which will produce from the shift register 21 the transmit frame of FIG. 2. The synchronization pulses and control bits are also added by the timing and control logic circuit 15.

The serialized data is thereafter modulated by the QPSK modulator 22 and frequency converted by mixer 24 onto a carrier signal supplied by oscillator 25 in the frequency band of 54 to 400 MHz, which is compatible with conventional television cable networks.

On the receive side of the modified CT2 base station, a second subcarrier is detected in mixer 27 and down converted by the operation of oscillator 28, operating in the 5 to 30 MHz. bandwidth. The intermediate frequency signal generated by mixer 27 is thereafter demodulated in the QPSK demodulator 26 to provide the receive frame data bits.

The receive frame structure is identical to transmit frame structure. The remote antenna sites compress 40 channels of multibit voice signals so that like order bits of all channels occur in the bit time interval of the CT2 radio telephone link.

The shift register 20 will convert the receive frame into 40 parallel channels under control of the system management and control module 16. The conversion of this serial data to parallel data is complementary to the process carried out by the shift register 21. The receive frame grouping of like bits is redistributed such that all serial bits of one channel are subsequently received on each of the 40 parallel digital channels.

At this point, there is decoding of the 40 channels of digital inbound telephone signals by the timing data decoding and control logic 19. This produces 40 channels of parallel data which may then be converted by the digital to analog converter 18 to analog telephone signals. These incoming signals constitute the other half of the telephone connection which is applied to the PBX 12. Thus, it can be seen that the CT2 base station of FIG. 3A modified to interface with a standard cable television network is capable of creating the transmit frame of FIG. 2 or removing the data from a receive frame in a format which can be readily converted and applied to the PBX 12.

Figure 3B:
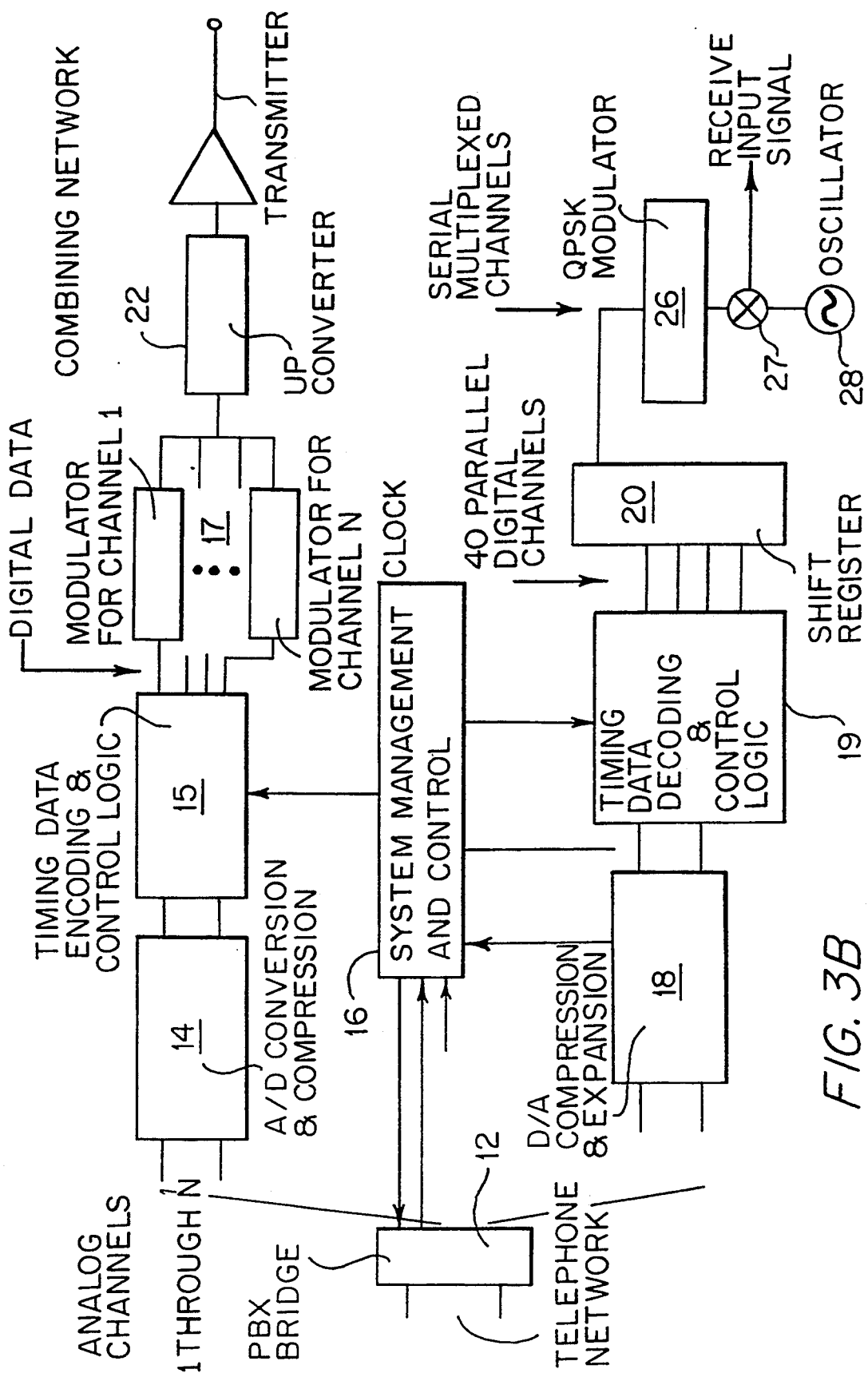
FIG. 3B illustrates a base station for interfacing 40 parallel digital channels of a CT2 base station with a cable television network.

FIG. 3B illustrates a second embodiment of a CT2 base station which employs parallel subcarriers which transmit one bit at a time from each of the 40 channels over a subcarrier representing each channel. In this hybrid system, the 40 subcarriers are received at each antenna site, and the data modulated thereon is transmitted via a separate set of carriers in accordance with the CT2 remote antenna site transmit specifications.

The illustration of FIG. 3B merely shows that both inbound and outbound traffic need not be packaged in identical, sequential frame structures as is proposed in the preferred embodiment of FIG. 3A. Rather, the shift register 21, QPSK modulator 22, mixer 24 and oscillator 25 can be replaced with the parallel operating SPC channel modulators 17. The individual SPC channel frequencies are frequency converted by converter 22, all of which are inserted onto the cable. The remaining circuitry of FIG. 3B is identical to that of 3A, and operates in the same fashion. It is contemplated that the receive frame would be constructed as was in FIG. 3B such that all the returning inbound digitized voice signals would be time-compressed to fit in the time frame of a single channel of a radio link of the CT2 specified system.

The remote antenna sites comprise a transceiver for communicating within the cellular area of the remote antenna site with either mobile or portable radio telephones. The transceivers of the remote antenna site include a receiver portion as well as a transmitter portion.

Figure 4:
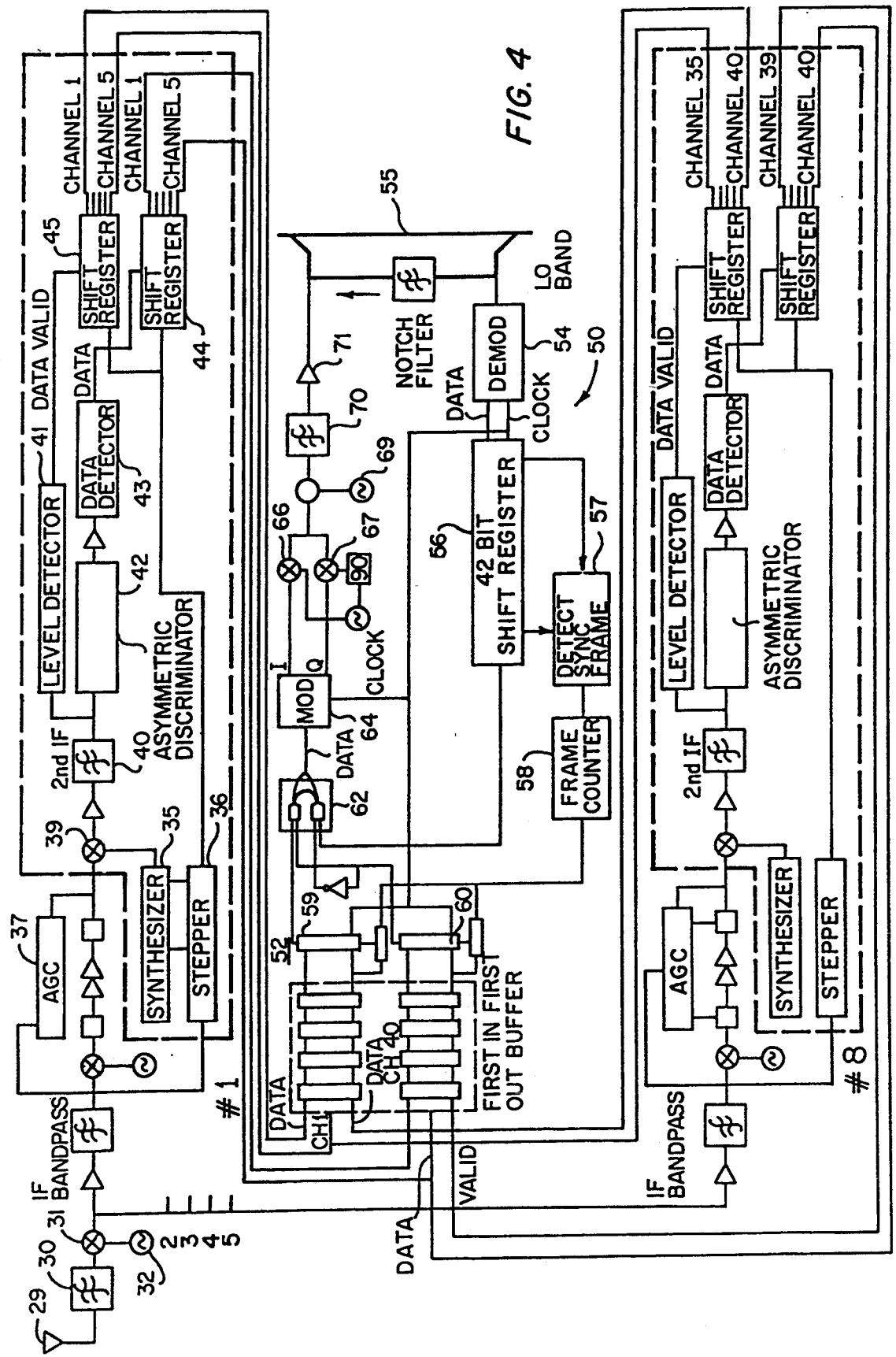
FIG. 4 illustrates the receive portion of remote antenna site communication equipment.

The receiver portion of the remote antenna site is shown schematically in FIG. 4. There are 8 intermediate frequency signal processors connected to a common local oscillator 32 and mixer 31. A common radio frequency tuning unit 30 and antenna 29 have a bandwidth for receiving 40 separate carriers dedicated to each channel of the CT2 radio frequency link with the radio telephones. These 40 separate carriers provide a transmit frame having a duration of the transmit frame of FIG. 2, but containing a single channel, each bit of the channel occupying a time slot of 13.8 microseconds.

The 8 intermediate frequency channels can process the common IF signal to identify individual IF signals containing each individual channel. The 8 intermediate frequency signal processors include a frequency synthesizer 35 which steps under control of a stepper 36 through five of the intermediate frequency channels corresponding to five RF channels bearing 5 digitized signals from five radio telephones. The need for 8 synchronously operating intermediate frequency sections occurs because of the limitations on stepping synthesizer frequencies through the required 40 different IF signal frequencies necessary to demodulate each of the 40 channels.

Turning specifically to the first intermediate frequency signal processor #1, processing of digitized voice signals from the radio telephone begins when the AGC circuit 37 indicates the beginnings of a receive frame, wherein digitized telephone traffic is being sent from the radio telephones back to the remote antenna sites. The AGC circuit 37 will initiate stepping of the stepper controller 36 to produce, in sequence, five baseband signals from mixer 39. The five baseband signals include the inbound digitized telephone traffic and are filtered and amplified in circuit 40. The amplitude of the baseband signal is detected for each of the five channels with level detector 41. The level detector 41 will produce a data valid bit each time the baseband signal level is high enough to produce a signal which can be reliably demodulated. A data valid/invalid bit is stored in shift register 45 for each data bit recovered. An asymmetric discriminator 42 is shown for demodulating the signal. The asymmetric discriminator 42 demodulates the QPSK signal to provide the raw digital data. A data detector 43 detects the presence or absence of a 1, 0 and provides this data to a shift register 44. Since the digital data stream from each channel is time coherent with each other channel, and each bit time is 13.8 microseconds, the synthesizer is stepped between one of five channel frequencies during each bit time. This approach requires that the discriminator 42 capture the FSK modulated data within 1 or 2 microseconds. During the bit time of 13.89 microseconds, the five frequencies are sampled and stored in the shift register. The data valid bit is stored in the second shift register 45, corresponding to the detected signal level which produced each demodulated bit. The synthesizer and demodulator requires 2 microseconds to tune the specific SCPC channel and demodulate the data bit. In addition to the ten microseconds for the five channels, one microsecond tolerance is provided to compensate for signal transmission delay across the cell from the radio telephone.

Using the remaining seven intermediate frequency signal processors, channels 6 through 40 may be detected and decoded within the 13.89 microseconds recovering each bit of the incoming digital radio telephone signal. By operating each of the intermediate frequency signal processors in parallel, demodulation of all eight bits of the 40 channels may be provided over the receive frame duration.

Shift registers 44, 45 are continually shifted until all data is loaded in FIFO buffer 52.

The channel data is then available for transmission to the head end via an interface 50, associated with FIG. 4. As was explained with respect to FIG. 1, remote antenna sites are "daisy chained" together such that the receive frame originates from the furthest remote antenna site and is forwarded to the next adjacent antenna site. The receive frame is updated with additional data acquired at the adjacent antenna site cell. The interface between the cable and the antenna site receivers, identified by 50 in FIG. 4, includes a first in-first out buffer 52 which stores the data obtained from each channel of the particular antenna site, along with the data valid bits associated with this data.

The process of receiving from the next adjacent antenna site a receive frame for updating with the first in-first out buffer data 52 begins when the demodulator connected to the cable television network 16 senses the presence of the receive frame, forwarded via a third subcarrier originating with the next more distant remote antenna site. The notch filter 55, having a notch frequency equal to the third subcarrier frequency, will prevent the third subcarrier from reaching the head end. The data and clock signal produced by demodulator 54 are applied to the 42 bit shift register 56. The 42 bit shift register 56 will clock in the receive frame and the presence of the frame is detected by sync frame detector 57. A channel bit number counter 58 is connected to the sync frame detector 57. As will be understood with respect to FIG. 5, this results in the contents of the first bit location for all 40 channels being loaded into a shift register 59, and the associated valid/invalid bits for each of these data bits being loaded into shift register 60.

Having thus loaded the first bit of every channel in shift register 59, this data can be combined with the receive frame channel data of the next most remote antenna as follows. Referring to FIG. 5, there is shown on line A thereof the received channel bit positions of the receive frame. As soon as the sync frame detector 57 detects the presence of the receive frame, the frame counter 58 is enabled for a first period defining that portion of the receive frame carrying all the channel bits of a first order.

At that time, the shift registers 59 and 60 are loaded in trace E with the FIFO buffer data. The shift clock, as shown in line D, produced from the demodulator 54, will then serially clock out each of the first order bits for all 40 channels stored in the shift register 59. This will occur as long as the data valid bits are in a logical 1 condition, indicating that it is reliable data to be inserted in the receive frame.

In the absence of a data valid bit, the gating circuit 62 will gate through digitized data bits received from the shift register 56 which originated from the next adjacent remote antenna site.

Thus, a stream of data is produced from the gating circuit 62 comprising the data bits received from the previous antenna site as well as those of the antenna site represented by FIG. 4. In the event both antenna sites produce data for the same channel, the antenna site shown in FIG. 4 will override that data position with the same data.

As FIG. 5 indicates, the frame counter begins again at the next sync pulse associated with the receive data frame for the next bit position for each of the channels. The next bit position is again augmented with any data received for that bit position and contained in the data buffer 52. The process continues until all bits of all 40 channels have been loaded in the receive frame. The new augmented receive frame is modulated by modulator 64 in synchronism with the clock signal produced by demodulator 54. The QPSK signals are combined in quadrature by quadrature modulators 66 and 67. A fourth subcarrier is generated by subcarrier generator 69. (If this is the last of the remote antenna sites, this subcarrier is at the second subcarrier frequency.) The fourth subcarrier signal generator 69 will mix the quadrature produced signal to a subcarrier frequency for communicating with the next, closer-in remote antenna site. A filter 70 and cable driver 71 will apply a fourth subcarrier modulated signal to the cable TV network 16.

Thus, it can be seen that the receive circuitry of FIG. 4 will receive a standard CT2 radio telephone receive frame, removing each of the digital bits from the dedicated 13.9 microsecond time slot, and reformatting it to the frame of FIG. 2, wherein each bit of a like number from all the channels occupies the former bandwidth of a single channel bit. The last antenna site to process the receive frame will transmit it to the head end on the second subcarrier frequency. Since the notch filter removes upstream subcarriers, subsequent subcarriers may be of the same frequency. Thus, the previously mentioned second, third and fourth subcarriers may have the same frequency, resulting in a savings of cable network bandwidth.

Figure 6:
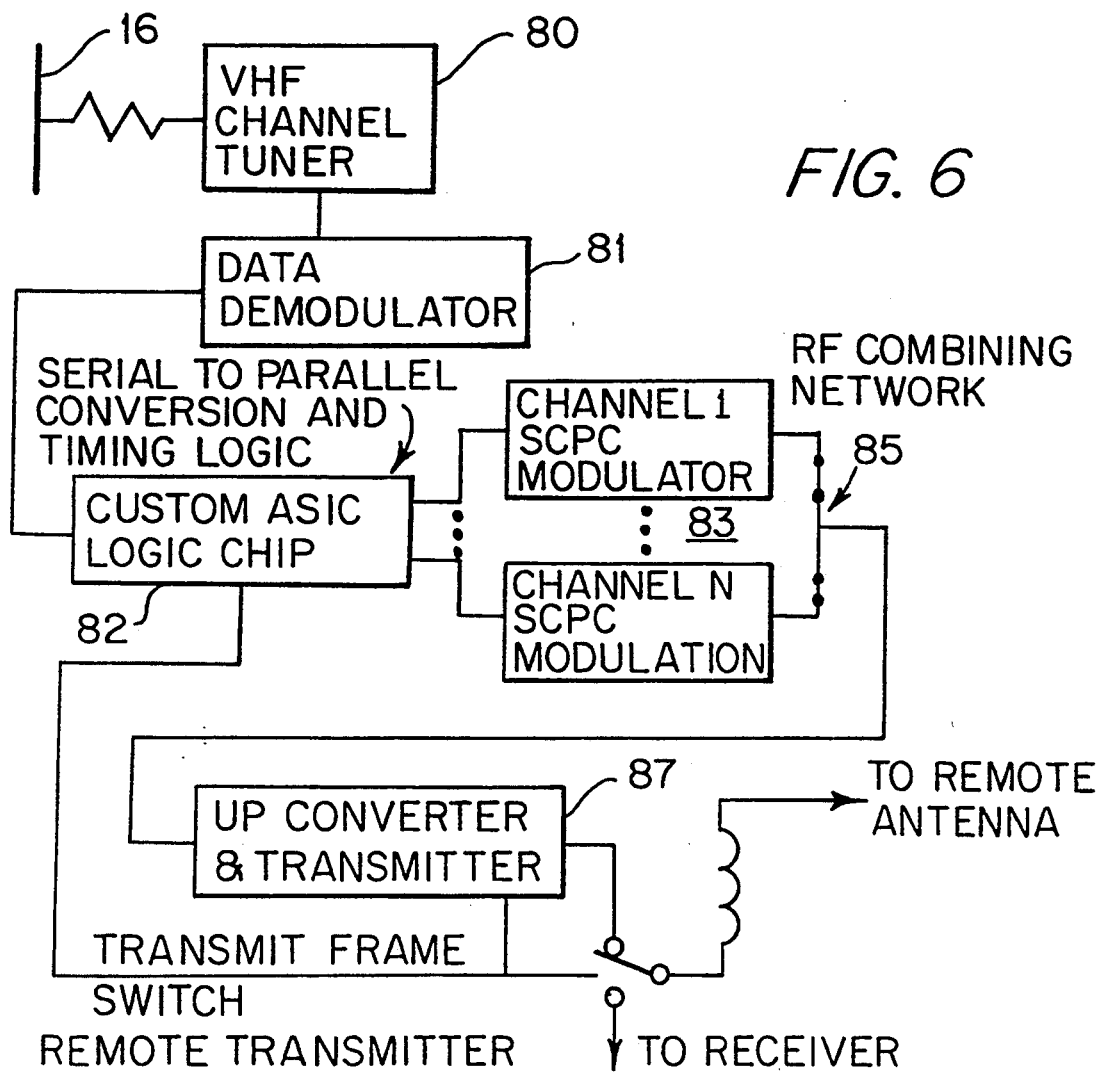
FIG. 6 illustrates the communication transmitter at the remote site for transmitting the 40 CT2 channels via a radio link to the cellular radio telephones.

The transmit portion of the transceiver at each remote antenna site is shown in FIG. 6. FIG. 6 includes a VHF channel tuner 80 connected to the cable television network 16. A data demodulator will demodulate the first subcarrier signal applied by the base station 13, and demodulate the QPSK signal containing the transmit frame to provide serial outbound channel data.

That portion of the serial data bearing the outbound telephone signal is converted in a serial to parallel converter 82 to 40 simultaneous channels. The transmit frame of FIG. 2 is therefore converted to a standard transmit frame of the CT2 specification, wherein the 40 parallel channels have a bit time of 13.89 microseconds.

Channel modulators 83 will modulate each of the channel signals on different subcarriers and all 40 subcarriers are combined by an RF combining network 85. The channel modulators 83, RF combining network 85, and up converter and transmitter 87 are conventional CT2 radio frequency components at the remote antenna sites. Once the signal has been converted to the CT2 specification by the serial to parallel converter 82, the remaining signal processing is in accordance with the CT2 specification.

A frame switch operates a transmit receive switch, thereby connecting the up converter and transmitter 87 to the cell antenna for communicating with the mobile radio telephones. The same antenna is used on the receiver of FIG. 4 once the transmit frame switch has returned to its guardband and receive frame position.

Thus, it can be seen that the cable television network 16 may be used to distribute CT2-originated base station signals, as well as receive from the CT2 remote antenna sites reformatted channel signals for connection to a standard local area network.

Thus, there is described with respect to one embodiment a system for distributing CT2 telephone traffic between a base station and remote antenna sites. Those skilled in the art will recognize yet other embodiments described more particularly by the claims which follow.

What is claimed is:

1. A method for distributing telephone calls between a telephone network and a plurality of remote telephones via a cable television network distributing television signals over at least one television channel, wherein said telephone network is connected to a base station, and wherein said remote telephones are served by a plurality of serially connected remote sites connected to said cable television network, said method comprising the steps of:
    (a) receiving, at said base station, a plurality of outgoing telephone calls from telephone lines comprising said telephone network;
    (b) inserting data indicative of said outgoing telephone calls received by said base station from said telephone network into a data frame;
    (c) applying said data frame to a data channel of said cable television network;
    (d) transmitting data in said data frame applied to said data channel of said cable television network to said remote telephones via a plurality of outgoing telephone channels using a radio frequency transceiver located at each one of said remote sites;
    (e) receiving incoming telephone calls from said remote telephones via a plurality of incoming telephone channels using said radio frequency transceiver;
    (f) adding data indicative of said incoming telephone calls received from said remote telephones to a second data frame;
    (g) applying said second data frame to said cable television network via a second channel of said cable television network for transmission to said base station: and
    (h) applying said data indicative of said incoming telephone calls in said second data frame to said telephone lines at said base station.

2. The method of claim 1, wherein said data frame comprises digital data.

3. A method for distributing telephone calls between a telephone network and a plurality of remote telephones via a cable television network distributing television signals over at least one channel, wherein said telephone network is connected to a base station, and wherein said remote telephones are served by a plurality of serially connected remote sites connected to said cable television network, said method comprising the steps of:

(a) receiving, at said base station, a plurality of outgoing telephone calls from telephone lines comprising said telephone network;

(b) inserting data indicative of said outgoing telephone calls received by said base station from said telephone network into a first data frame:

(c) applying said first data frame to a first channel of said cable television network;

(d) transmitting data in said first data frame applied to said first channel of said cable television network to said remote telephones via a plurality of outgoing telephone channels using a radio frequency transceiver located at each one of said remote sites;

(e) receiving incoming telephone calls from said remote telephones via a plurality of incoming telephone channels using said radio frequency transceiver;

(f) adding data indicative of said incoming telephone calls received from said remote telephones to a second data frame;

(g) applying said second data frame to said cable television network via a second channel of said cable television network for transmission to said base station; and, (h) applying said data indicative of said incoming telephone calls in said second data frame to said telephone lines at said base station.

4. The method of claim 3, wherein said inserting step includes:

monitoring said second data frame to determine whether said data indicative of said incoming telephone calls received from each of said plurality of incoming telephone channels has an acceptable signal level; and inserting only said incoming digital data for each of said plurality of incoming telephone channels having said acceptable signal level into said second data frame.

5. The method of claim 3, wherein said monitoring step further comprises:

setting a Data Valid bit for each of said plurality of incoming telephone channels indicating whether a given one of said incoming telephone channels has said acceptable signal level; and, checking said Data Valid bit for each of said plurality of incoming telephone channels to determine for which said channels said incoming digital data is to be inserted into said second data frame.

6. The method of claim 3, wherein said first data frame and said second data frame each comprise digital data.

7. A system for distributing telephone calls between a telephone network and a plurality of remote telephones via a cable television network distributing television signals over at least one channel, said system comprising:

(a) a base station connected to said telephone network including:
(1) means for receiving a plurality of outgoing telephone calls from telephone lines comprising said telephone network;
(2) means for inserting data indicative of said outgoing telephone calls into a first data frame;
(3) means for applying said first data frame to said cable television network via a first carrier channel of said cable television network;
(4) means for receiving a second data frame comprising data indicative of incoming telephone calls via a second carrier channel of said cable television network;
(5) first conversion means for converting said data indicative of incoming telephone calls in said second data frame into a plurality of said incoming telephone calls;
(6) means for applying said incoming telephone calls to said telephone lines; and, (b) a plurality of serially connected remote sites, each of which is also interconnected to said cable television network via a pass-through connection, wherein each of said remote sites includes:
(1) means for extracting said first data frame from said cable television network;
(2) second conversion means for converting said data indicative of said outgoing telephone calls in said first data frame to outbound data to be transmitted over a plurality of outgoing telephone channels;
(3) a radio frequency transceiver for transmitting said outbound data on said plurality of outgoing telephone channels to said remote telephones, and for receiving said incoming telephone calls on a plurality of incoming telephone channels from said remote telephones:
(4) insertion means for adding data contained in said incoming telephone calls to said second data frame; and,
(5) means for applying said second data frame to said cable television network via said second carrier channel.

8. The system of claim 7, wherein said first conversion means at said base station for converting said data indicative of said incoming telephone calls in said second data frame to a plurality of incoming telephone signals includes:

analog-to-digital conversion means for converting said outgoing signals to digital signals; and means for forming said first data frame comprising said digital signals.

9. The system of claim 7, wherein said insertion means at each of said remote sites includes:

means for monitoring said second data frame to determine whether said data indicative of said incoming telephone calls received from each of said plurality of incoming telephone channels has an acceptable signal level; and means for inserting only said incoming digital data for each of said plurality of incoming telephone channels having said acceptable signal level into said second data frame.

10. The system of claim 9, wherein said monitoring means at each of said remote sites further comprises:

means for setting a Data Valid bit for each of said plurality of incoming telephone channels indicating whether a given one of said incoming telephone channels has said acceptable signal level; and, means for checking said Data Valid bit for each of said plurality of incoming telephone channels to determine for which said channels said incoming digital data is to be inserted into said second data frame.

11. The system of claim 7, wherein said first data frame and said second data frame each comprise a plurality of like ordered data bits for each of said incoming telephone channels.

12. A system for distributing telephone traffic between a telephone network and a plurality of remote telephones via a cable television network distributing television signals over at least one channel, said system comprising:

(a) a base station connected when in use to said telephone network, including:
(1) means for receiving a plurality of outgoing signals from telephone lines comprising said telephone network;
(2) means for inserting said outgoing signals into a first data frame comprising outgoing digital data;
(3) means for applying said first data frame to a cable television network via a first subcarrier of said cable television network;
(4) means for receiving a second data frame comprising incoming digital data from said cable television network via a second subcarrier having a frequency different from that of said first subcarrier;
(5) first conversion means for converting said incoming digital data in said second data frame to a plurality of incoming telephone signals;
(6) means for transmitting said plurality of incoming telephone signals over said telephone lines; and, (b) a plurality of serially connected remote sites, each of which is also interconnected to said cable television network via a pass-through connection, wherein each of said remote sites includes:
(1) means for extracting said first data frame from said cable television network:
(2) second conversion means for converting said outgoing digital data in said first data frame to a plurality of outgoing telephone channels;
(3) a radio frequency transceiver for transmitting said plurality of outgoing telephone channels to said remote telephones, and for receiving said incoming digital data on a plurality of incoming telephone channels from said remote telephones:
(4) means for receiving said second data frame from a next upstream one of said remote sites on said cable television network via said second subcarrier;
(5) insertion means for adding said data received in said second data frame from said next upstream one of said remote sites to said incoming digital data received from said plurality of incoming telephone channels; and,
(6) means for transmitting said second data frame to a closest downstream one of said remote sites on said cable television network via said second subcarrier;

wherein the one of said remote sites closest to said base station transmits said second data frame to said base station.

13. The system of claim 12, including means for filtering out said second subcarrier received from said next upstream one of said remote sites.

14. A system for distributing telephone calls between a telephone network and a plurality of remote telephones via a cable television network distributing television signals over at least one channel, said system comprising:

(a) a base station connected to said telephone network, wherein said base station includes:
(1) means for receiving a plurality of outgoing telephone calls from telephone lines comprising said telephone network:
(2) means for inserting data indicative of said outgoing telephone calls received by said receiving means into a first data frame;
(3) means for applying said first data frame to a first channel of said cable television network; and, (b) a plurality of remote sites, each of which is serially interconnected by said cable television network, wherein each of said remote sites includes:
(1) a radio frequency transceiver for transmitting data in said first data frame applied to said first channel of said cable television network to said remote telephones via a plurality of outgoing telephone channels, and for receiving incoming telephone calls from said remote telephones via a plurality incoming telephone channels;
(2) insertion means for adding data contained in said incoming telephone calls received from said remote telephones to a second data frame; and,
(3) means for applying said second data frame to said cable television network via a second channel for transmission to said base station.

* * * * *

UNITED STATES PATENT AND TRADEMARK OFFICE
CERTIFICATE OF CORRECTION

PATENT NO. : 5,381,459
DATED : January 10, 1995
INVENTOR(S) : Lappington It is certified that error appears in the above-identified patent and that said Letters Patent is hereby corrected as shown below:

On column 5, line 62, change "u" to read --$\mu$--. (Greek mu symbol)
On column 10, line 54, change ":" to read --;--.
On column 12, line 31, move "television network via said second carrier channel." up
                    to the end of line 30, to read -- said cable television network via
                    said second carrier channel.--

On column 13, line 30, change ":" to read --;--.
On column 13, line 38, change ":" to read --;--.
On column 14, line 22, change ":" to read --;--.

Signed and Sealed this

Fifth Day of September, 1995

*Attest:*

BRUCE LEHMAN

*Attesting Officer*      *Commissioner of Patents and Trademarks*